United States Patent

King et al.

[15] 3,671,495
[45] June 20, 1972

[54] THERMALLY STABLE POLYESTER FIBERS HAVING INHERENT DISPERSE DYE UPTAKE AND SUPERIOR OIL STAIN RELEASE PROPERTIES

[72] Inventors: Henry L. King; Eugene L. Ringwald, both of Cary, N.C.; James C. Randall, Jr., Bartlesville, Okla.

[73] Assignee: Monsanto Company, St. Louis, Mo.

[22] Filed: May 22, 1970

[21] Appl. No.: 41,243

Related U.S. Application Data

[63] Continuation-in-part of Ser. No. 789,528, Jan. 7, 1969, abandoned, and a continuation-in-part of Ser. No. 824,092, May 13, 1969, and a continuation-in-part of Ser. No. 874,638, Nov. 6, 1969, and a continuation-in-part of Ser. No. 34,742, May 5, 1970, and a continuation-in-part of Ser. No. 32,675, April 28, 1970.

[52] U.S. Cl. ............................................. 260/77, 8/DIG. 4
[51] Int. Cl. ........................................................ C08g 17/08
[58] Field of Search .................... 260/77, 7.5 T; 264/176 F

[56] References Cited

UNITED STATES PATENTS

| 2,556,295 | 6/1951 | Pace | 260/75 X |
|---|---|---|---|
| 2,895,946 | 9/1959 | Huffman | 260/75 |
| 3,033,824 | 5/1962 | Huffman | 260/75 |
| 3,042,656 | 7/1962 | Frey | 260/77 |
| 3,165,499 | 1/1965 | Alles | 260/75 |
| 3,177,277 | 4/1965 | Adams et al. | 260/75 |
| 3,223,752 | 12/1965 | Tate et al. | 260/873 |
| 3,461,468 | 8/1969 | Morgan et al. | 260/75 T X |

*Primary Examiner*—Melvin Goldstein
*Attorney*—Thomas Y. Awalt, Jr., Robert L. Broad, Jr., Neal E. Willis and E. J. Fischer

[57] ABSTRACT

Thermally stable fiber-forming polyesters having superior inherent oil-stain release properties are obtained by heat-setting at temperatures of from about 175° F. to about 375° F., filaments or fabrics produced from dicarboxylic acids, or reactive derivatives thereof, glycols and small amounts of mixtures of compounds having a typical general formula: $R-O[G-O]_x-H$, where R is an alkyl group containing an average of about eight to 20 carbon atoms; G is a hydrocarbon radical selected from the group consisting of ethylene, propylene and isomers thereof, and mixtures of the above; and $x$ has an average value of at least equal to or greater than 9, no greater than about 20, and about equal to or greater than R.

14 Claims, 9 Drawing Figures

FIG.1. LOSS OF FORMALDEHYDE OF VARIOUS ETHYLENE OXIDE POLYETHERS

FIG.2. DISPERSE DYEABILITY AS A FUNCTION OF R

FIG.3. DISPERSE DYEABILITY AS A FUNCTION OF X

FIG.4. MINERAL OIL RETENTION

FIG.5. MINERAL OIL RETENTION

INVENTORS
HENRY L. KING
EUGENE L. RINGWALD
JAMES C. RANDALL, JR.

INVENTORS
HENRY L. KING
EUGENE L. RINGWALD
JAMES C. RANDALL Jr.

BY
ATTORNEY

THERMALLY STABLE POLYESTER FIBERS HAVING INHERENT DISPERSE DYE UPTAKE AND SUPERIOR OIL STAIN RELEASE PROPERTIES

This is a continuation-in-part application of our co-pending applications Ser. No. 789,528, filed Jan. 7, 1967; now abandoned Ser. No. 824,092, filed May 13, 1969; Ser. No. 874,638, filed Nov. 6, 1969; Ser. No. 34,742, filed May 5, 1970; and Ser. No. 32,675, filed Apr. 28, 1970.

BACKGROUND OF THE INVENTION

This invention relates to polyesters produced by condensation reactions of polymethylene glycols and dicarboxylic acids or reactive derivatives thereof.

It is well known that some polymeric polyesters prepared by the condensation of a glycol or its functional derivatives and a dicarboxylic acid or a polyester-forming derivative thereof, such as an acid halide, a salt, or a simple ester of a dibasic acid and volatile monohydric alcohol are excellent fiber-forming polymers. Commercially, highly polymeric polyesters are prepared, for example, by the condensation of terephthalic acid or dimethyl terephthalate and a glycol containing from about two to 10 carbon atoms. These polyesters are relatively insoluble, chemically inactive, hydrophobic materials capable of being formed into filaments which can be cold-drawn to produce textile fibers of superior strength and pliability. However, it is well known that these materials are highly susceptible to oil staining, and once stained with an oil-type stain, are extremely difficult if not impossible to restore to an unstained condition. Moreover, since these materials are not readily permeable to water, they cannot be satisfactorily dyed by ordinary dyeing procedures.

Unmodified polyesters are presently being treated externally with finishes and the like in order to provide a measure of oil stain resistance and oil release. Unfortunately, these finishes are expensive to apply, and being applied externally, are, as a general rule, easily removed by washing.

The compact structure of polyethylene terephthalate fibers the molecules of which are closely packed along the axis of the fibers, makes it quite difficult, except with a limited number of dyes, to obtain a high degree of dyebath exhaustion or to secure satisfactory deep shades. Absorption and penetration of the dye into the fiber core are limited by the inherent properties of the fiber.

A number of methods have been proposed to increase the dyeability of polyesters, and particularly polyethylene terephthalate; however, most have not proved to be entirely satisfactory. These methods have included the use of a number of additives to the polyester and various combinations of drawing and heat-treatment steps and procedures. Unfortunately, the use of most of these known procedures has resulted in thermally unstable polyesters, deterioration in fiber properties, nonuniformly dyed polymers, and the like. Finally, the art has desired some other means to produce thermally stable polyesters having improved dyeability. Thermally stable polyesters with improved dyeability would have significant commercial and practical value and utility.

Our co-pending applications Ser. No. 824,092, filed May 13, 1969, describes the use of small amounts of compounds having a typical general formula: $R-O[G-O]_x-H$ where R is an alkyl group containing an average of from about eight to 20 carbon atoms; G is a hydrocarbon radical selected from the group consisting of ethylene, propylene and isomers thereof, butylene and isomers thereof, and mixtures of the above; and $x$ has an average value of from eight to 20, and is about equal to or greater than R. These modified polyester compositions are prepared by reacting an aromatic dicarboxylic acid, the polymethylene glycol and a small amount of the glycol additive under polyesterification conditions until a fiber-forming polymeric polyester composition is obtained. Small amounts of a chain-branching agent may also be added to the reaction as desired. These modified polyester compositions are useful in the production of shaped articles by extrusion, molding, or casting in the nature of yarns, fabrics, films, pellicles, bearings, ornaments, or the like. They are particularly useful in the production of thermally stable dyeable textile fibers having improved dyeability, particularly with disperse dyes. Our co-pending application Ser. No. 874,638 describes the use of similar compounds having the same typical general formula: $R-O[G-O]_x-H$, but in which the parameters differ in that the average maximum number of carbon atoms in the alkyl group R is not limited to 20, butylene and isomers thereof are not included in the group of hydrocarbon radicals G, $x$ has a minimum average value of 9, and there is no requirement that the value $x$ be equal to or greater than R. Using these parameters, fibers having inherent oil release qualities as well as heat stability were produced.

SUMMARY OF THE INVENTION

It is an object of this invention to provide a process for preparing synthetic linear condensation polyesters suitable for production of filaments, fibers, fabrics, and the like which have the inherent permanent capability of releasing oil-type stains as well as inherent superior thermal stability in oxygen or air and disperse dye uptake characteristics. It is another object of this invention to provide a modified polyester filament having superior thermal stability in oxygen or air, permanent disperse dye uptake characteristics, and a superior and permanent capability of releasing oil-type stains.

Briefly, the objects of this invention are accomplished by heat-setting at from about 275° F. to about 375° F. modified polyester fibers prepared by extruding a fiber-forming polyester prepared from a dicarboxylic acid and a glycol and containing in the polymer a small amount of compounds having a typical general formula: $R-O[G-O]_x-H$, where R is an alkyl group containing an average of about eight to 20 carbon atoms, G is a hydrocarbon radical selected from the group consisting of ethylene, propylene and isomers thereof, and mixtures of the above; and $x$ has an average value equal to or greater than 9, no greater than about 20, and about equal to or greater than R. Mixtures of these compounds may also be used. The additive may be used at concentrations of from about 0.25 mole percent to about 3 mole percent based on the moles of the dibasic acid or derivative employed (the upper limit being dictated primarily by processability considerations) with a preferred mole percent concentration of from about 0.75 using the higher molecular weight compounds, to about 2.0 when using the lower molecular weight compounds.

The modified polyester compositions of this invention are prepared by reacting an aromatic dicarboxylic acid, the polymethylene glycol and a small amount of the alkoxy glycol additive under polyesterification conditions until a fiber-forming polymeric polyester composition is obtained. Small amounts of a chain-branching agent may also be added to the reaction as desired.

To further understand the invention, reference will be made to the attached drawing that forms a part of the present application.

DESCRIPTION OF THE PREFERRED EMBODIMENTS

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by drawing. Among the polyesters and copolyesters specifically useful in the instant invention are those resulting from heating one or more of the glycols of the series $HO(CH_2)_nOH$, in which "$n$" is an integer from 2 to 10, or cycloaliphatic glycols, with one or more dicarboxylic acids and ester-forming derivatives thereof useful in the present invention there may be named terephthalic acid, isophthalic acid, p,p'-dicarboxybiphenyl, p,p'-dicarboxydiphenyl sulfone, p,p-dicarboxydiphenylmethane, and the aliphatic, cycloaliphatic, and aryl esters and half-esters, ammonium and amine salts, and the acid halides of the above-named compounds and the like. Examples of the polyhydric alcohols which may be employed in practicing the instant invention are ethylene glycol, trimethylene glycol, and tetramethylene glycol, cyclohexane dimethanol, and the like. Polyethylene terephthalate, however, is the preferred polymer because of the ready availability of terephthalic acid or dimethyl terephthalate and ethylene glycol, from which it is made. It also has a relatively high melting point of about 250°–256° C., and this property is particularly desirable in the manufacture of filaments in the textile industry.

The additives which are an essential part of this invention are compounds having a typical general formula: R—O[G—O]$_x$—H, where R is an alkyl group containing an average of about eight to 20 carbon atoms; G is a hydrocarbon radical selected from the group consisting of ethylene, propylene and isomers thereof, and mixtures of the above, and $x$ has an average value equal to or greater than 9, no greater than about 20, and about equal to or greater than R. By "average" is meant that the alkoxy glycol additive may comprise mixtures of the alkoxy glycol with some variances from the figures shown; but that the average of the integers in the mixture will be as indicated. Included within the meaning of "about equal", as used herein, is ±2. Preferably, the R group contains 12–16 carbon atoms. As the degree of polymerization ($x$) increases, so does the inherent capability of resisting and releasing oil-type stains in a fabric prepared from the ester. The additive may be used at concentrations of from about 0.25 to 3 mole percent based on the moles of the dibasic acid or derivative with a preferred mole percent concentration of from about 0.75, using the higher molecular weight compounds to about 2.0, using the lower molecular weight compounds.

As is well known in the textile finishing art, alcohols are converted to alkoxy glycols by reacting, to the hydroxyl group of the appropriate alcohol, the appropriate alkylene oxide to form an ether, as, for example:

One mole of this ether is then further reacted with an additional alkylene oxide to produce the alkoxy poly(oxyalkylene) glycol(polyoxyalkylene ether) as follows:

The preparation of the alcohols for use in this process is also well known in the chemical arts. Primary alcohols, for example, may be obtained from natural sources, as via the hydrogenolysis of fats or fatty acids or by the reduction of fatty acids with an alcohol or an alkaline metal. Hydrogenolysis is the reduction of a fatty acid, anhydride, ester of a fatty acid or metallic salt of a fatty acid to yield a fatty alcohol. The well known sodium reduction process is a typical example of the means by which the fatty esters may be reduced. The alcohols may also be produced from synthetic sources as, for example, by the Oxo process which involves the addition of carbon monoxide and hydrogen to an olefin in the presence of a cobalt catalyst to produce an aldehyde. The next step consists of hydrogenation of the aldehyde.

The alkoxy poly(oxyalkylene) glycols can be prepared, for example, by: (1) etherification by reaction of alkyl bromide and monosodium salt of polyalkylene glycol, commonly known as the Williamson synthesis:
RBr + NaO(CH$_2$CH$_2$O)$_n$H → RO(CH$_2$CH$_2$O)$_n$H + NaBr; (2) etherification by reaction of alkyl-p-toluene sulfonate and polyalkylene glycol:

as well as by the above described etherification by reaction of alcohol and alkylene oxide, which is the most common of these reactions. The ethylene oxide condensation, may be carried out in the presence of an acidic or a basic catalyst, the latter being the most commonly used method for the manufacture of alkoxy poly(oxyethylene) glycols.

Autoxidation is the phenomenon which is responsible for much of our environmental chemistry. It is involved in the aging of fats and oils, drying of paints, and degradation of natural and synthetic fibers. The processes involved may be catalyzed by heat or light and are free radical by nature. Generally speaking, autoxidation proceeds by free radical, chain mechanisms; peroxy radicals and hydroperoxide groups are formed which are precursors to other products. Typical products from autoxidation processes are alcohols and carbonyl-containing compounds. Chain-terminating reactions significantly affect the rates of autoxidation processes.

The products observed from the autoxidation of alkoxy polyethylene glycols are principally alcohol and formate ester chain-terminal groups and formaldehyde, carbon dioxide, and water. Formaldehyde is a major volatile product. As above stated, significant and surprising differences in thermal stability in the presence of oxygen have been observed among the various alkoxy polyethylene glycols. The type of alkoxy unit and the degree of polymerization are apparently related to the susceptibility of autoxidation.

It has been found, for example, that as the number of carbon atoms in the alkoxy end group (R) is increased beyond the methoxy (with degree of polymerization held constant) there is a surprising decrease in the amount of formaldehyde evolved when the glycol additive is heated in a sweep of air at 193° C., until the alkoxy group reaches eight carbon atoms, after which there is a leveling off. Further increase beyond eight to 14 carbon atoms in the alkoxy group causes no appreciable difference in the heat stability of the glycol. Exemplifying the above, alkoxy-terminated polyethylene glycol polymers have the structural formula: $R-(OCH_2CH_2)_{12}-OH$, were subjected to the above-described conditions, and liberated formaldehyde in accordance with the following table.

TABLE I

| R-Number of Carbon Atoms in Hydrocarbon Unit | 15 min. | 30 min. | 60 min. | 90 min. | 120 min. |
|---|---|---|---|---|---|
| 1 | 460 | 800 | 1340 | 1520 | 1700 |
| 4 | 460 | 790 | 1050 | 1140 | 1300 |
| 8 | 320 | 470 | 600 | 720 | 820 |
| 14.5* | 320 | 510 | 770 | 820 | 880 |
| 20 | 320 | 450 | 760 | 720 | 790 |

*Alkoxy glycol prepared from mixture of 14 and 15 carbon atoms.

It was also discovered that when these same alkoxy glycols were used as chain terminators in the production of modified polyesters, the heat stability effect was carried over to the polyester fiber.

Figure 1:
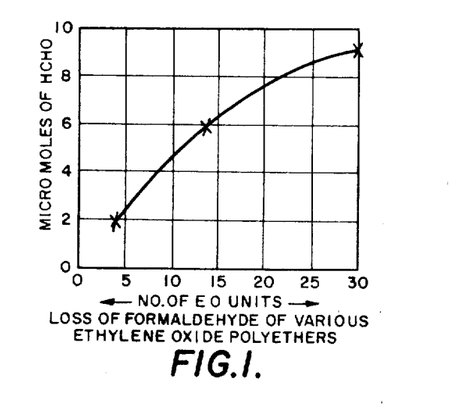
FIG. 1 is a graph showing the amount of formaldehyde loss at 195° C. for 60 minutes of alkoxy polyethylene glycols varying in the number of ethylene oxide units present in the molecules.

On the other hand, where the number of carbon atoms in the alkoxy end group was held constant at about 14 and the degree of polymerization of the polyether chain was increased, the compounds being heated in a sweep of air at 195° C., for 60 minutes, there was a marked increase in the number of micro-moles of formaldehyde released as the degree of polymerization (number of ethylene oxide units was increased from about 5 to 30, indicating a decrease in heat stability of the alkoxy glycol as shown in FIG. 1. Therefore, so far as heat stability alone is concerned, it appears that an alkoxy poly(oxyalkylene) glycol as described above where R is an alkyl group containing no less than eight carbon atoms, and with an extremely low degree of polymerization would be optimum.

Figure 2:
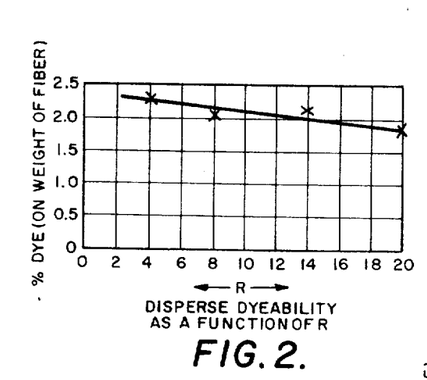
FIG. 2 is a graph showing the relative disperse dyeability in terms of percentage of the dye, based on the weight of the fiber, of polyester fibers modified with alkoxy polyethylene glycols in which the carbon atoms in the alkoxy group represented by R in the general formula, was varied between 4 and 20, with the number of ethylene oxide units ($x$) constant at a value of 12–14.
Figure 3:
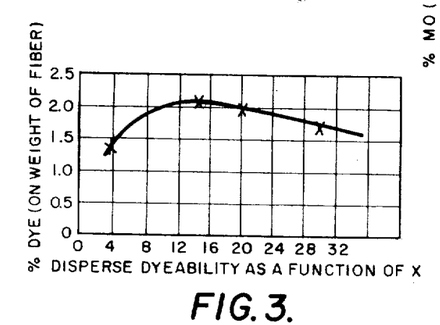
FIG. 3 is a graph showing the relative disperse dyeability in terms of percentage of dye on the weight of the fiber, of polyester fibers modified with an alkoxy polyethylene glycol in which the number of ethylene oxide units ($x$) was varied from between 4 and 30, with R constant at a value of from 12–14.

As stated above, however, dyeability of the modified polymer is an extremely important factor so far as the use of these additives is concerned. In FIG. 2, the effect on fiber dyeability of changes in the number of carbon atoms in the alkoxy group (R) with the degree of polymerization ($x$) being held constant at 11-13 is shown; and in FIG. 3, the effect of changes in the degree of polymerization ($x$) with R being held constant at 14.5 is shown. FIGS. 2 and 3 show the disperse dyeability of these compounds in terms of percent dye on the weight of the fiber, dyeing being accomplished as explained in Example 1. It will be observed from FIG. 2 that there is a tendency toward decreased dyeability as the number of carbon atoms in the alkoxy end group of the additive is increased. FIG. 3 shows a substantial increase in dyeability as the degree of polymerization ($x$) is increased from about 4 to about 12-14, and thereafter a decrease in dyeability.

A minimum optimum value of 8 representing the number of carbon atoms in the alkoxy end groups has thus been established on the basis of heat stability, and a maximal optimum value of 20 has been established beyond which there is no substantial increase in heat stability, but there is a corresponding decrease in disperse dyeability (FIG. 2).

The degree of polymerization has been established on the basis of dyeability with about 8 as a minimally marginal value and 20 as a marginally maximum value (FIG. 3), with decreasing heat stability across the range (FIG. 2). An additional limiting factor involving the relationship of R to $x$ will be developed in the examples.

Figure 5:
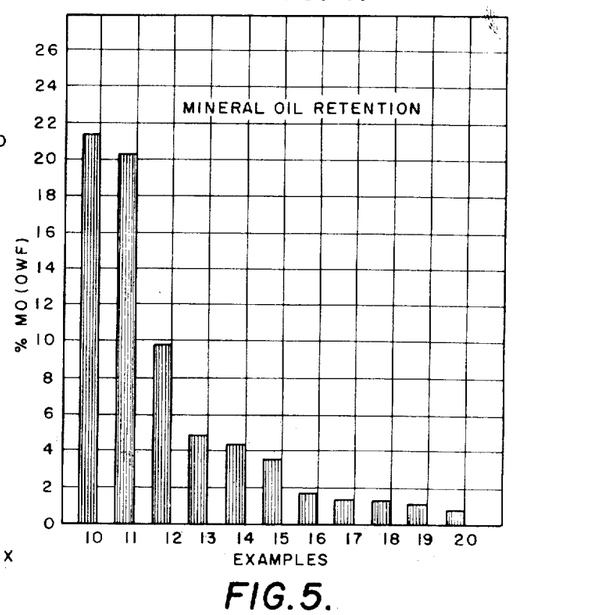
FIG. 5 is a bar graph showing varying amounts of mineral oil (percent o.w.f.) retained on similar fabric samples using the same weight percent of various alkoxy polyethylene glycol chain terminators.

As shown in FIG. 5 (the compound structure being described under Examples 10-20), however, a degree of polymerization ($x$) of 9 is minimally optimum so far as comparative oil stain release properties are concerned. Much more preferable are the alkoxy poly(oxyalkylene) glycols with a degree of polymerization of 12 or more from the standpoint of oil stain retention and release.

Figure 6:
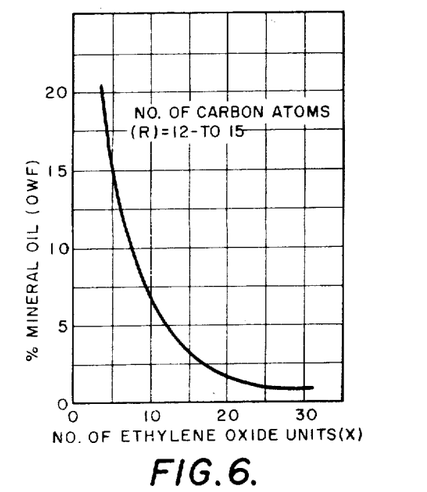
FIG. 6 is a graph showing the effect of increases of the number of ethylene oxide units ($x$) on mineral oil stain retention where the number of carbon atoms in the alkyl group (R) of the alkoxy polyethylene glycol is held constant at from 12–15, the amount of the alkoxy polyethylene glycol being used in each case being 5 percent by weight based on the polymer.
Figure 7:
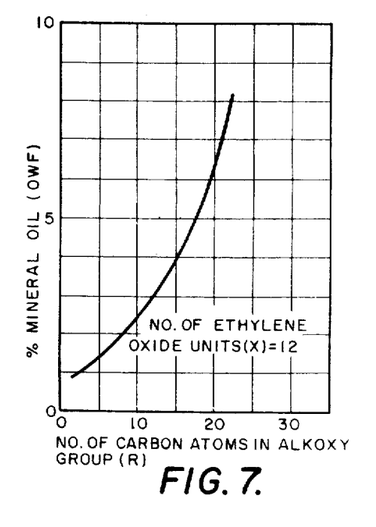
FIG. 7 is a graph showing the effect in terms of mineral oil retention (percent o.w.f.) of changes in the number of carbon atoms in the alkyl group (R) of the alkoxy polyethylene glycol, where the number of ethylene oxide units ($x$) was held constant at about 12.
Figure 8:
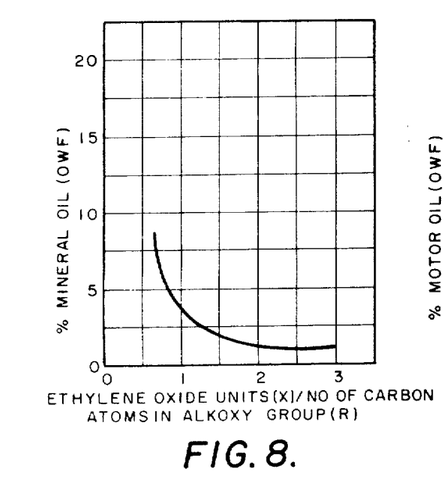
FIG. 8 is a graph showing the relationship of the ratio of ethylene oxide units ($x$) to the number of carbon atoms in the alkyl group (R) of the alkoxy polyethylene glycol, in terms of mineral oil retention (percent o.w.f.)

FIGS. 6, 7 and 8 illustrate the although the degree of polymerization ($x$) is the most significant single factor in characterizing the alkoxy poly(oxyalkylene) glycols in terms of oil stain release, especially good results are obtained where the ratio of ethylene oxide units ($x$) to the number of carbon atoms in the alkyl group (R) is about equal to or greater than 1. This is not to say that satisfactory oil stain release qualities may not be obtained unless the ratio of $x$ to R is about equal to or greater than 1; for commercially acceptable inherent oil stain release qualities (under 10 percent of retention) may be obtained where the ratio is less than 1 (see Examples 14 and 16); however, for exceptionally fine oil stain release qualities (3 percent retention or less based on the testing described) this ratio applies.

A minimum optimum value of 8 representing the number of carbon atoms in the alkoxy end group has thus been established on the basis of heat stability, and a minimum optimum value of 9 as a degree of polymerization, has been established on the basis of oil stain retention and release characteristics, recognizing that as the degree of polymerization is increased, there is a corresponding decrease in heat stability, with $x = 20$ being maximally acceptable. The parameters of this invention have thus been established by determinations of minimum and maximum values of R and $x$, which will produce a polyester having this unique and hitherto unforeseeable combination of essential characteristics.

The precise structure of G is not considered critical in the instant invention except insofar as it must exclude the alkoxy (polyoxymethylene) glycols which depolymerize under polyester polymerization conditions. We have found that the alkoxy poly(oxyethylene) and alkoxy poly(oxypropylene) glycols (including copolymers and block copolymers) and mixtures thereof produce good results in accordance with this invention.

The above can be partially explained in terms of inhibition of further autoxidation by products formed from the terminal alkoxy group in the initial stage of oxidation. Those derived from the short alkyl chains are volatile at the test temperature, and escape without acting as inhibitors.

When the additive contains an alkoxy group which is an effective inhibitor of autoxidation, the number of alkyleneoxy units in the polyether additive becomes significant. It has been found that chains having more than 25 units are not adequately stable. This is believed to result from the low concentration of the inhibiting terminal alkoxy group in such a chain. On the other hand, a low number of alkyleneoxy units per molecule results in an excessive number of chain terminations when an adequate weight of the modifier is added to achieve the desired dyeability and oil stain release characteristics. Poor processability results from excessive chain termination.

Since the hydrophobic alkyl portion of the additive makes very little, if any, contribution to the enhanced dyeability, it is desirable that a major portion of the molecule be comprised of the hydrophilic polyether chain. Thus, alkoxy poly(oxyalkylene) glycols in which the number of oxyalkylene groups is about equal to or greater than the number of carbon atoms in the alkyl group, resulting in a polymer composed of more than seventy percent by weight of hydrophilic of the portion, as will be shown in the examples, are most effective (see Table II).

If desired, the modified polyesters of this invention may contain chain-branching agents, which, as taught in U.S. Pat. No. 2,895,946, are employed to increase the viscosity of molecular weight of the polyesters, such as polyols which have a functionality greater than two, that is, they contain more than two functional groups, such as hydroxyl. Examples of suitable compounds are pentaerythritol; compounds having the formula: R—(OH)$_n$ wherein R is an alkylene group containing from three to six carbon atoms and $n$ is an integer from 3 to 6, for example, glycerols, sorbitol, 1,2,6-hexanetriol and the like; compounds having the formula: R—(CH$_2$OH)$_3$ wherein R is an alkyl group containing from two to six carbon atoms, for example, trimethylol ethane, trimethylol propane, and the like compounds up to trimethylol hexane; and the compounds having the formula:

wherein $n$ is an integer from 1 to 6. As examples of compounds having the above formula, there may be names 1,3,5-trimethylol benzene, 1,3,5-triethylol benzene; 1,3,5-tripropylol benzene, 1,3,5-tributylol benzene; and the like.

Aromatic polyfunctional acids or their esters may also be employed in this invention as chain-branching agents, and particularly those having the formula:

wherein R is H or an alkyl group containing one to three carbon atoms and $x$ is an integer of 3 or 4. As examples of compounds having the above formula, there may be named trimesic acid, trimethyl trimesate, and tetramethyl pyromellitate, and the like. In addition, there may be employed mixtures of the above acids and esters which are obtained in practical synthesis. That is, in most instances, when preparing any of the compounds having the above formula, other related compounds having the same formula may be present in small amounts as impurities. This does not affect the compound as a chain-branching agent in the preparation of the modified polyesters and copolyesters described herein.

The chain-branching agents may be employed in the preparation of the polyesters and copolyesters in amounts ranging from 0 to 0.7 mole percent, based on the amount of dicarboxylic acid or ester-forming derivative thereof employed in the reaction mixture. If the chain-branching agent is tetra-functional, as for example, pentaerythritol, quantities not in excess of 0.45 mole percent should be used. The preferred concentration of a tetra-functional chain-branching agent is about 0.2 mole percent. If a tri-functional chain-branching agent, such as for example, trimesic acid, is used, somewhat more is required for results equivalent to that of the tetra-functional chain-branching agent, and amounts up to 0.7 mole percent may be used. The preferred concentration of a tri-functional chain-branching agent is 0.5 mole percent.

In the practice of the present invention, the dibasic acid or ester-forming derivative thereof, the glycol, and the alkyoxy polyalkylene glycol are charged to the reaction vessel at the beginning of the first stage of the esterification reaction, and the reaction proceeds as in any well-known esterification polymerization. If desired, the chain-branching agent may also be charged to the reaction vessel at this time.

When preparing the polyester from an ester, such as dimethyl terephthalate, the first stage of reaction may be carried out at 170° to 180° C. and at a pressure of 0 to 7 p.s.i.g. If the polyester is prepared from the acid, such as terephthalic acid, the first stage of reaction may be carried out at about 220°–260° C. and at pressures of from atmospheric to about 60 p.s.i.g. The methanol or water evolved during the first stage of reaction is continuously removed by distillation. At the completion of the first stage, the excess glycol, if any, is distilled off prior to entering the second stage of the reaction.

In the second stage or polymerization stage, the reaction may be conducted at reduced pressures and preferably in the presence of an inert gas, such as nitrogen blanket over the reactants, the blanket containing less than 0.003 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220°–300° C. This stage of the reaction may be effected either in the liquid melt or solid phase. In the liquid phase, particularly, reduced pressures must be employed in order to remove the free ethylene glycol which emerges from the polymer as a result of the condensation reaction.

Although the process of this invention may be conducted stepwise, it is particularly adaptable for use in the continuous production of polyesters. In the preparation of the described polyesters, the first stage of the reaction takes place in approximately three-fourth to 2 hours. The use of an ester-interchange catalyst is desirable when starting with dimethyl terephthalate. In the absence of a catalyst, times up to 6 hours may be necessary in order to complete this phase of the reaction. In the polymerization stage, a reaction time of approximately 1 to 4 hours may be employed with a time of 1 to 3 hours being the optimum depending on catalyst concentration, temperature, viscosity desired, and the like.

The linear condensation polyesters, produced in accordance with the present invention, have specific viscosities in the order of about 0.25 to 0.6, which represent the fiber- and filament-forming polymers.

Specific viscosity, as employed herein, is represented by the formula:

$$N{\rm sp} = \frac{\text{Time of flow of the polymer solution in seconds}}{\text{Time of flow of the solvent in seconds}} - 1$$

Viscosity determinations of the polymer solutions and solvent are made by allowing said solutions and solvent to flow by force of gravity at about 25° C. through a capillary viscosity tube. In all determinations of the polymer solution viscosities, a solution containing 0.5 percent by weight of the polymer dissolved in a solvent mixture containing two parts by weight of phenol and one part by weight of 2,4,6-trichlorophenol, based on the total weight of the mixture is employed.

The polyesters of this invention may be produced to form filaments and films by melt-spinning methods and can be extruded or drawn in the molten stage to yield products that can be subsequently cold-drawn to the extent of several hundred percent of their original lengths, whereby molecularly oriented structures of high tenacity may be obtained. The condensation product can be cooled and comminuted followed by subsequent remelting and processing to form filaments, films, molded articles and the like.

Alternatively, the polyesters of this invention may be processed to shaped objects by the wet-spinning method, wherein the polyesters are dissolved in a suitable solvent and the resulting solution is extruded through a spinnerette into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or those agents may be incorporated with the initial reactants. Such added agents might be plasticizers, antistatic agents, fire-retarding agents, stabilizers, and the like.

It has now been discovered that a pronounced enhancement of the oil stain release qualities of these fibers, or fabrics produced from these fibers, may be obtained by employing heat-set temperatures of from about 275° F. to about 375° F. at a stage of processing subsequent to the orientation drawing of the newly formed filaments. Ordinarily, in the commercial manufacture of polyester filaments, fiber and the like, the filaments may be subjected to a heat-set treatment subsequent to the orientation drawing of the filament, but prior to end use processing. Subsequently, while still in filament or fiber form, or more commonly after having been woven into fabrics, heat may be applied during the dyeing process, if any. A third processing step frequently involving the application of heat is in the so-called "heat-setting" of the fabric. Heat-setting of the filament may or may not be under tension. If heat is used in the dyeing process, the filaments may or may not be under tension. The presence or absence of tension during the application of heat will, as is well known in the art, affect the degree of shrinkage of the individual filament. As would be expected, the degree of shrinkage of the individual filament or of the fabric, as well as such other variables affecting the density of the fabric as the type of knitting or weaving, will cause variations in the oil strain release properties of a fabric due to differences in the size and amount of exposure of individual filaments to washing. Nevertheless, it is the application of heat, however applied, which brings about this unexpected enhancement of oil stain release properties.

Figure 9:
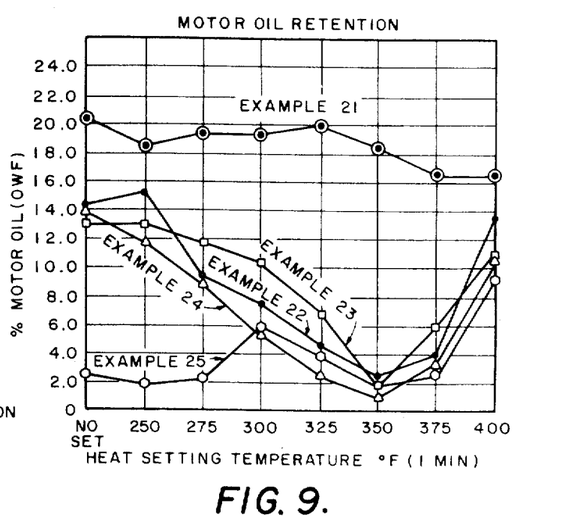
FIG. 9 is a graph showing the effect of various heat-set temperatures on polyesters modified with various alkoxy polyethylene glycols.

As shown in FIG. 9, the oil stain release properties of unmodified polyester are relatively unaffected by the application of heat. In the case of polyesters modified with methoxy polyethylene glycol, very little change in oil release characteristics was experienced upon exposure to heat at temperatures up to 350° F. On the other hand, polyesters modified with additives of the type within the parameters of this invention were materially affected as shown by a marked increase in oil stain release capability as heat-set temperatures were increased about 275° F. up to 350° F., after which there was a marked decrease in the oil stain release capability, with some accompanying thermal degradation. Good results are nevertheless achieved at temperatures up to 375° F. and above.

The duration of the heat treatment should be such as to achieve a temperature equilibrium within the filaments. For most textile grade fibers, filaments and light loose fabrics, a period of 1 minute will suffice. For higher denier filaments or tighter or heavier fabrics, additional exposure time should be allowed.

To further illustrate the present invention and the advantages thereof, the following specific examples are given, it being understood that these are merely intended to be illustrative and not limitative. Unless otherwise indicated, all parts and percents are by weight.

The following procedure was used to prepare the polymers in examples. The charge was added directly to a standard polyester autoclave and the system was purged six times with nitrogen, allowing the pressure to rise to 150 p.s.i.g., and then releasing it slowly to atmospheric pressure each time. Heat was then applied to the closed system, and when the temperature inside the autoclave had reached 100°–125° C., the stirrer was started. When the temperature of the outside wall of the autoclave had reached about 250° C. (the inside temperature being about 230°–235° C. and the pressure being about 25 p.s.i.g.), the off-vapor valve was adjusted to maintain these conditions of temperature and pressure. As the first distillate containing water and some ethylene glycol appeared, the esterification stage was considered to have started. The stirrer speed was set at 250 r.p.m. This esterification step usually took from about 40 to 60 minutes for completion, after which the pressure of the system was adjusted to atmospheric pressure. The heating rate was then increased until the temperature reached about 280° C. During this time, excess ethylene glycol was distilled off. An ethylene glycol slurry of titanium dioxide was introduced through an injection port when the inside temperature had reached about 260°–265° C. Then the inside temperature was raised to about 280° C., the pressure was maintained at less than 2 mm. Hg. and the polymerization continued until a polymer having a specific viscosity in the fiber-forming range between 0.30 to less than about 0.4 was formed. The polymer was extruded through a spinnerette, and the filaments obtained were drawn about five times their original length over a hot pin at about 80° C.

The dyeing test used in Examples 1–8 was as follows: Fiber samples of about 3 denier were scoured and dried. One-half gram of fiber and 20 ml. of dye solution were placed in a small glass tube capable of withstanding internal pressure. The dye solution was prepared by mixing 250 mg. of a disperse dye and 0.5 gram of a commercial dispersing agent in a 250 ml. volumetric flask together with an amount of deionized water sufficient to fill the flask to the mark. The dye tubes were placed in a rotating rack held within a steam bath, and rotated for two hours at a temperature of about 210° F. The tubes were then quickly quenched in ice, and 5 ml. aliquots were pipeted into 50 ml. volumetric flasks which were then filled with dimethylformamide. The optical density of each solution was measured in a 1 cm. cell at the dominant wavelength of the dye. A blank tube (dye only) was also prepared and its optical density measured in the same way. The percent dye uptake on weight of the fiber (o.w.f.) was calculated using the following equation:

$$\frac{O.D.\ blank - O.D.\ sample}{O.D.\ blank} \times \text{Original dye concentration}\ (\%) = \text{Percent dye uptake}\ (o.w.f.)$$

(where O.D. = optical density)

During the processing of the polyester filaments, staples, blends, fabric, and the like, heating at various temperatures for various periods of time is often necessary, e.g., polyester fabrics may be subjected to temperatures of 175° C. or higher for periods of up to 10 minutes or more. The following thermal stability tests were run where indicated: A 5-gram sample of the polyester was fluffed into a ball, placed in an aluminum cup into which about 10 ½-inch holes had been punched, and the ball was heated for 10 minutes at 175° C. in a circulating-air oven, often with a thermocouple held at the center of the ball.

Figure 4:
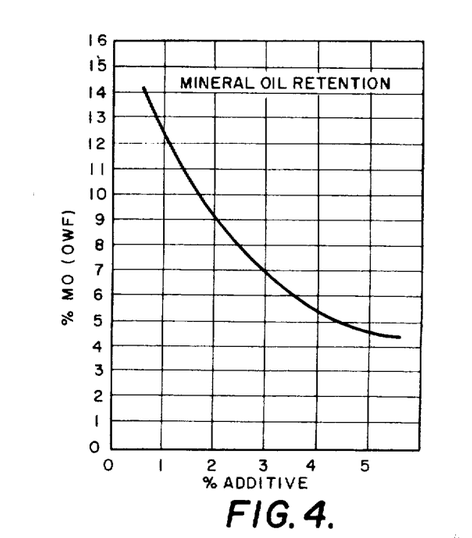
FIG. 4 is a graph showing the amounts of mineral oil retained on samples of fabric produced in accordance with this invention using various amounts (in terms of weight percent based on the weight of the polymer) of a typical alkoxy polyethylene glycol (a reaction product of 14 molar equivalents of ethylene oxide with an approximate equimolar mixture of straight chain alcohols having 14–15 carbon atoms) the fabric having been saturated with mineral oil, and subsequently washed with a standard detergent and rinsed; all as described below for testing of oil stain release characteristics.

The oil stain retention and release tests used through Example 20 were based on mineral oil retention on a fabric prepared from a 50/10 continuous filament prepared in accordance with this invention (except that no heat treatment was employed) and plied three times into a 150/30 knitting yarn, thereafter knitted with a 70 gauge knitting head (feed rate: 26.4 in./course) to produce fabric samples at 86 courses per inch and 36 wales per inch. Rectangular sample fabric swatches from 6–12 grams were cleaned by extraction for four hours with methanol; then by a 4-hour extraction with hexane. They were each stained with mineral oil by tumbling in a jar of "Squibb" heavy liquid petroleum for 4 hours. A fresh aliquot of the oil was used for each staining. After tumbling, excess mineral oil was removed from the swatch samples by padding on a Butterworth Laboratory Padder. Two passes through the rollers at 50-pounds pressure were made. The first pass removed most of the oil. On the second pass, the swatches were sandwiched between paper towels to remove residual oil between fibers. This technique provided a fairly uniform pick-up on all samples averaging about 21 percent based on the weight of the fiber. Fabric samples were laundered in a Kenmore laboratory washer (Catalogue No. 3057340) for 15 minutes followed by two rinse cycles of 10 minutes each. Initial water temperature was 160° F. for both washing and rinsing. Concentration of detergent was 1 gram/liter. The detergent used was a standard commercial detergent, "Tide (XK)". The liquor-to-fabric ratio was approximately 135:1. Fabric samples were then tumbled dry in a "Sears (Lady Kenmore)" dryer with the "dryness control" set on 4. Fabric samples were then extracted with hexane for about 2 hours and the hexanes extracts were evaporated in aluminum cups. The residual percent mineral oil based on the weight of the fibers was determined by the weight of the mineral oil remaining in the cups. Each fabric sample was tested five times, the average thereof being shown on FIGS. 4 and 5. Consecutive use of the samples, as described, indicate that oil retention and release qualities are not affected by continuous washing. As used herein, the word "permanent" describes a quality resistant to effects of wash and wear and retained so long as the structural integrity of the fibers, filaments, etc. is maintained.

The oil stain retention and release test used in Examples 21-25 were based on a typically commercial (Quaker State) nondetergent S.A.E. 30 motor oil retention on tube fabric samples also prepared from 50/10 continuous filament prepared by plying two ends of the filament with twist and knitting with 70 gauge needles (feed rate: 26.4 in./course) to samples averaging about 100 courses per inch, 33 wales per inch, a yarn denier of about 95, a denier per filament of about 5, a plied twist of about 4, and a weight of about 3.5 ounces per square yard. Samples averaging about 5 grams were cleaned by extraction as with previous examples, stained as in previous examples, and otherwise subjected to the same test treatment as in previous examples except that the liquor-to-fabric ratio of the commercial detergent "Tide (XK)" was about 520:1. The average of two tests is shown on FIG. 9.

During the processing of polyester filaments, staple, blends, fabric, and the like, heating at various temperatures for various periods of time is often necessary, e.g., polyester fabrics may be subjected to temperatures of 175° C. or higher for periods up to 10 minutes or more. The following thermal stability test was run where indicated: A 5-gram sample of polyester was fluffed into a ball, placed in an aluminum cup into which about 10 ½-inch holes had been punched, and the ball was heated for 10 minutes at 175° C.(350° F.) in a circulating air oven, with a thermocouple held at the center of the ball.

EXAMPLE 1

The autoclave was charged with 166 grams of terephthalic acid, 400 ml. of ethylene glycol, 0.078 gram of lithium sulfate, 0.967 gram of antimony trioxide, 0.20 gram of pentaerythritol; and 10 grams of methoxypolyethylene glycol having an average molecular weight of about 550.

The fiber took up 2.2 percent o.w.f. of Latyl Brilliant Blue 2G dye (C.I. Disperse Blue 61). Unmodified polyethylene terephthalate took up 0.6 percent o.w.f. of this dye.

The fiber fused severely when heated at 175° C. for 10 minutes, the thermocouple within the carded ball recording at a temperature of 220° C.

EXAMPLES 2-8

Example 2 — The autoclave was charged with 165 grams terephthalic acid, 330 ml. ethylene glycol, 0.04 grams lithium acetate, 0.1 gram antimony glycoloxide, 0.3 gram pentaerythritol, and 8.0 grams of the reaction product of 4 molar equivalents of ethylene oxide with an approximate equimolar mixture of straight chain alcohols having 14-15 carbon atoms. Polymer and fiber were prepared following the procedure described in Example 1. Examples 3-8 were conducted in the same manner as Example 2 with the exception that the amounts of pentaerythritol used in each example were as follows: Example — —0.15 grams; Example 4 — 0.2 grams; Example 5 — 0.25 grams; Example 6 — 0.25 grams; Example 7 — 0.25 grams; and Example 8 — 0.00 grams. The alkoxy poly(oxyalkylene) glycols used had the general formula: RO[CH$_2$CH$_2$O]$_x$—H for which the number of carbon atoms in the alkyl group R and the degree of polymerization of ethylene oxide (x) are shown in Table II. The resulting percent dye uptake is shown for each sample.

TABLE II

| Example | R | x | % Dye Uptake |
|---|---|---|---|
| 2 | 14-15 | 4 | 1.36 |
| 3 | 14-15 | 30 | 1.77 |
| 4 | 14-15 | 14 | 2.09 |
| 5 | 12 | 20 | 1.93 |
| 6 | 4 | 12 | 2.28 |
| 7 | 8 | 12 | 2.07 |
| 8 | 20 | 12 | 1.86 |

The above results further substantiate the data shown in FIGS. 1-6, and establish the relationship between R and x which is theorized above. Example 4 was tested for heat stability and resisted fusion when heated at 175° C. for 10 minutes.

EXAMPLE 9

The autoclave was charged with 165 grams terephthalic acid, 330 ml. ethylene glycol, 0.04 gram lithium acetate, 0.1 gram antimony glycoloxide, 0.2 gram pentaerythritol, and 10 grams of the reaction product of 14 molar equivalents of ethylene oxide with an approximate equimolar mixture of straight chain alcohols having 14-15 carbon atoms. Polymer and fiber were prepared following the procedure described in Example 1. The sample was tested for heat stability and resisted fusion when heated to 175° C. for 10 minutes. When tested for oil stain retention and release, the sample was found to have retained less than 5 percent based on the weight of the fiber, of the mineral oil.

EXAMPLES 10-20

The autoclave was charged with 165 grams terephthalic acid, 330 ml. ethylene glycol, 0.04 gram lithium acetate, 0.1 gram antimony glycoloxide, 0.3 gram pentaerythritol, and 10 grams (5 percent by weight based on the polymer) of the following chain-terminating compounds.

| Example | Compound Structure R-O[CH$_2$CH$_2$O]$_x$-H* |
|---|---|
| 10 | None |
| 11 | R = 14-15; x = 4 |
| 12 | R = 12-13; x = 9 |
| 13 | R = 22; x = 12 |
| 14 | R = 20; x = 12 |
| 15 | R = 13; x = 12 |
| 16 | R = 8; x = 12 |
| 17 | R = 14-15; x = 30 |
| 18 | R = 4; x = 12 |
| 19 | R = 12; x = 20 |
| 20 | R = 1; x = 45 |

* where R is an alkyl radical having the number of carbon atoms indicated.

Fabric samples were prepared for oil stain retention and release testing as described above; and the results of the mineral oil retention and release testing are illustrated by FIG. 5.

EXAMPLES 21-25

Polymer samples were prepared as in Examples 10-20, the polymer being modified with 5 percent by weight (based on the polymer) of the following chain terminating compounds:

| Example | Compound Structure R-O[CH$_2$CH$_2$O]$_x$-H* |
|---|---|
| 21 | None |
| 22 | R = 4; x = 12 |
| 23 | R = 14-15; x = 14 |
| 24 | R = 8; x = 12 |
| 25 | R = 1; x = 45 |

* where R is an alkyl radical having the number of carbon atoms indicated.

Fabric samples were heat-set under light tension for 1 minute at temperatures indicated. They were prepared for motor oil stain retention and release testing as described; and the results of the motor oil stain retention and release testing are illustrated in FIG. 9.

We claim:

1. A process for preparing a thermally stable inherently dyeable synthetic linear condensation polyester fiber having inherent and permanent oil stain release properties which comprises heat-setting at about 275°-375° F., orientation drawn filaments extruded from a polymer consisting of at least 85 percent by weight of the polyester of terephthalic acid, a glycol, selected from HO $(CH_2)_nOH$, in which $n$ is an integer from 2 to 10, and cyclohexanedimethanol and from about 0.25–3 mole percent, based on the moles of the terephthalic acid, of a chain terminating compound having the general formula: $R-O[G-O]_x-H$, where R is an alkyl group containing about eight to 20 carbon atoms, G is a hydrocarbon radical selected from the group consisting of ethylene, propylene and isomers thereof, and butylene and isomers thereof, and $x$ is an integer having a value equal to or greater than 9, and no greater than about 20, and about equal to or greater than the number of carbon atoms in R.

2. The process of claim 1 wherein said chain terminating compound is present in an amount of about 0.75–2.0 mole percent based on the moles of the terephthalic acid.

3. The process of claim 1 wherein up to about 0.45 mole percent, based on the weight of the terephthalic acid, of a tetra-functional chain-branching agent selected from the group consisting of: (a) compounds having the formula: $R-(OH)_4$ wherein R is an alkylene group containing from three to six carbon atoms; (b) aromatic tetra-functional acids or their esters is included in the reaction mixture.

4. The process of claim 1 wherein the tetra-functional chain-branching agent is pentaerythritol in the amount of about 0.2 mole percent.

5. The process of claim 1 where up to about 0.7 mole percent, based on the weight of the terephthalic acid of a tri-functional chain branching agent selected from the group consisting of: (a) compounds having the formula: $R-(OH)_3$ wherein R is an alkylene group containing three to six carbon atoms; (b) compounds having the formula: $R-(CH_2OH)_3$ where R is an alkyl group containing from two to six carbon atoms; (c) compounds having the formula:

wherein $n$ is an integer from 1 to 6, and (d) aromatic tri-functional acids or their esters, is included in the reaction mixture.

6. The process of claim 5 wherein the tri-functional chain-branching agent is trimesic acid in an amount of about 0.5 mole percent.

7. The process of claim 1 wherein the heat-set temperature is about 300°–350° F.

8. The process of claim 1 where the duration of said heat-setting is about 1 minute.

9. The product of the process of claim 1.
10. The product of the process of claim 2.
11. The product of the process of claim 3.
12. The product of the process of claim 5.
13. The product of the process of claim 7.
14. The product of the process of claim 8.

* * * * *

Disclaimer 3,671,495.—*Henry L. King* and *Eugene L. Ringwald*, Cary, N.C., and *James C. Randall, Jr.*, Bartlesville, Okla. THERMALLY STABLE POLYESTER FIBERS HAVING INHERENT DISPERSE DYE UPTAKE AND SUPERIOR OIL STAIN RELEASE PROPERTIES. Patent dated June 20, 1972. Disclaimer filed June 1, 1971, by the assignee, *Monsanto Company*.

Hereby disclaims the portion of the term of the patent subsequent to June 6, 1989.

[*Official Gazette May 29, 1973.*]